United States Patent [19]
Francis

[11] 3,906,110
[45] Sept. 16, 1975

[54] ANTIHYPERTENSIVE α-(1-ARALKYLAMINOALKYL)-ARALKOXYBENZYL ALCOHOLS

[75] Inventor: John E. Francis, Briarcliff Manor, N.Y.

[73] Assignee: Ciba-Geigy Corporation, Ardsley, N.Y.

[22] Filed: Feb. 7, 1973

[21] Appl. No.: 330,356

[52] U.S. Cl. ............................ 424/330; 260/570 R
[51] Int. Cl.² ...................................... A61K 31/135
[58] Field of Search ................. 260/570 R; 424/330

[56] References Cited
UNITED STATES PATENTS
3,562,330  2/1971  Nordin ........................ 260/570.5 R OTHER PUBLICATIONS
Chemical Abstracts 73: 130768z, 130770u, 130774y, 130772w, 130773x, (1970).

*Primary Examiner*—Albert T. Meyers
*Assistant Examiner*—Leonard Schenkman
*Attorney, Agent, or Firm*—Joseph G. Kolodny; John J. Maitner; Theodore O. Groeger

[57] ABSTRACT

α-(1-bisarylalkylaminoalkyl)-aralkoxybenzyl alcohols, e.g. those of the formula

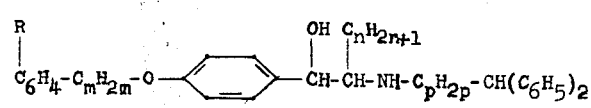

R = H, alkyl, alkoxy, halogeno or $CF_3$
m, p = 1 to 4
n = 0 to 4 and therapeutically acceptable salts thereof are hypotensive and cardioactive agents.

2 Claims, No Drawings

ANTIHYPERTENSIVE α-(1-ARALKYLAMINOALKYL)-ARALKOXYBENZYL ALCOHOLS

SUMMARY OF THE INVENTION

The present invention concerns and has for its object the provision of new α(1-bisarylalkylaminoalkyl)-aralkoxybenzyl alcohols, more particularly of those corresponding to Formula I

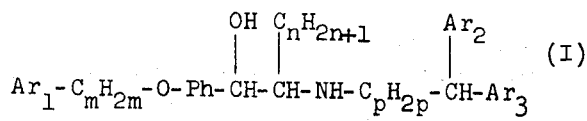

wherein each of $Ar_1$, $Ar_2$ and $Ar_3$ is unsubstituted phenyl or phenyl substituted by one or more then one member of lower alkyl, lower alkoxy, halogeno or trifluoromethyl, Ph is unsubstituted 1,3- or 1,4-phenylene or such phenylene substituted by one member listed for $Ar_1$, $n$ is an integer from 0 to 4 and each of $m$ and $p$ is an integer from 1 to 4, or of therapeutically useful salts thereof, as well as of correspsonding pharmaceutical compositions and of methods for the preparation and application of said products, which are useful hypotensive and cardioactive agents.

DESCRIPTION OF THE PREFERRED EMBODIMENTS

Of the phenyl radicals $Ar_1$ is preferably phenyl substituted by up to five, advantageously one or two members of the group consisting of lower alkyl, e.g., methyl, ethyl, n- or i-propyl or -butyl; lower alkoxy, e.g. methoxy, ethoxy, n- or i-propoxy or -butoxy; halogeno, e.g. fluoro, chloro or bromo; or trifluoromethyl, whereas each of $Ar_2$ and $Ar_3$ is preferably unsubstituted phenyl or phenyl substituted by one member of the group listed for $Ar_1$. The term "lower", referred to above or hereinafter in connection with organic radicals or compounds respectively, defines such with up to 4, preferably up to 3, advantageously such with one or two carbon atoms.

The phenylene radical Ph is preferably unsubstituted 1,4-phenylene, but also 1,3-phenylene, or 1,3- or 1,4-phenylene substituted by one member of lower alkyl, lower alkoxy, halogeno or trifluoromethyl, e.g. those listed for $Ar_1$.

The lower alkyl group $C_nH_{2n+1}$ preferably represents methyl, but also any other member mentioned above. The lower alkylene group $C_mH_{2m}$ preferably stands for $(CH_2)_m$, especially methylene, but also for 1,1- or 1,2-ethylene, 1,1-, 2,2-, 1,2- or 1,3-propylene or -butylene, and $C_pH_{2p}$ preferably represents $(CH_2)_p$, especially 1,2-ethylene, but also any other of the above alkylene groups.

Salts of the compounds of Formula I are preferably therapeutically acceptable acid addition salts, e.g. those derived from the acids listed below.

The compounds of the invention exhibit valuable pharmacological properties, primarily hypotensive, antihypertensive and bradycardic activity. This is demonstrable in animal tests, using advantageously mammals, e.g. rats, cats or dogs, as test objects. The animals may either be normotensive or hypertensive, e.g. genetically or adrenal regeneration hypertensive rats. Said compounds can be applied to them enterally or parenterally, advantageously orally, or subcutaneously, intravenously, intraperitoneally or intraduodenally, for example within gelatin capsules or in the form of starchy suspensions or aqueous solutions respectively. The applied dosage may range between about 0.1 and 100 mg/kg/day, preferably between about 1 and 50 mg/kg/day, advantageously between about 5 and 25 mg/kg/day. The lowering effect on the blood pressure is recorded directly by means of a catheter, e.g. placed in the rat's caudal or dog's femoral artery, and a transducer, expressing the blood pressure prior and after dosing in mm Hg. Thus, for example, the d,1-erythro-α-[1-(3,3-diphenylpropylamino)-ethyl]-p-(m-chlorobenzyloxy)-benzyl alcohol, a representative member of the compounds of the invention, advantageously in the form of its hydrochloride and preferably the dextrorotatory antipode thereof, is very effective in said hypertensive rats at p.o. doses as low or lower than 5 mg/kg/day and maximally about 24 hours after dosing. Antihypertensive doses cause only minor impairment of sympathetic nerve function, unlike antihypertensive agents which act by adrenergic neuron blockade, as assessed by pressor responses to electrical stimulation of the spinal cord of pithed rats. Said member also differs from certain centrally acting antihypertensive agents which cause sedation. Moreover, said d,1-hydrochloride does not cause brain catechol amine-depletion, unlike said centrally acting agents, although it does cause depletion in peripheral tissues, such as the heart. Of said member, the levorotatory hydrochloride in rats lowers the heart rate more than the blood pressure and thus differs from its antipode. Accordingly, the compounds of the invention are useful antihypertensive and bradycardic agents, for example in the treatment or management of primary or secondary hypertension or angina pectoris respectively. They are also useful intermediates in the preparation of other valuable products, especially of pharmacologically active compositions.

Particularly useful are compounds of Formula I, in which each of $Ar_1$, $Ar_2$ and $Ar_3$ is phenyl, (lower alkyl)$_q$-phenyl, (lower alkoxy)$_q$-phenyl, (halogeno)$_q$-phenyl or (trifluoromethyl)-phenyl, Ph is 1,3- or 1,4-phenylene, (lower alkyl)-1,3- or 1,4-phenylene, (lower alkoxy)-1,3- or 1,4-phenylene, (halogeno)-1,3- or 1,4-phenylene or (trifluoromethyl)-1,3- or 1,4-phenylene, $n$ is an integer from 0 to 4 and each of $m$ and $p$ is an integer from 1 to 4 and $q$ an integer from 1 to 5, or therapeutically useful acid addition salts thereof.

Outstanding compounds of the invention are those of Formula II

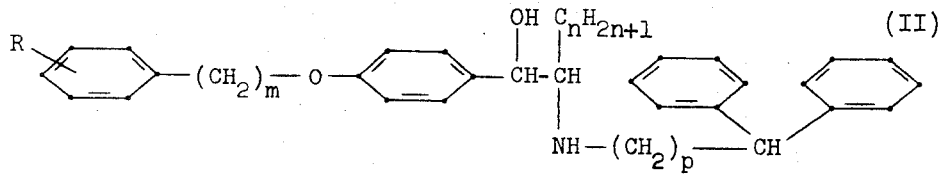

wherein R is hydrogen, methyl, methoxy, fluoro, chloro, bromo or trifluoromethyl and each of $m$, $n$ and $p$ is the integer 1 or 2, or therapeutically useful acid addition salts thereof.

Most preferred are the compounds of Formula II, wherein R is hydrogen, methyl, methoxy or chloro, advantageously in meta- or para-position, each of $m$ and $n$ is the integer 1 and $p$ the integer 2, or therapeutically useful acid addition salts thereof.

The compounds of the invention are prepared according to methods known per se, advantageously by:

1. reducing carbonyl compounds of Formula III

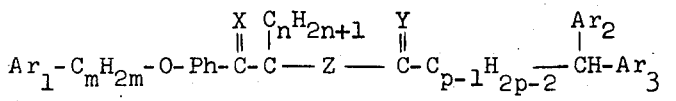

wherein one or both of X and Y is oxygen, the other is HOH or $H_2$ respectively and Z is free or protected NH, or 2. reducing olefines or Schiff's bases of Formula IV

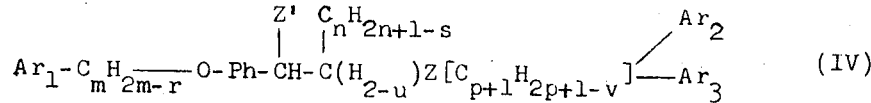

wherein at least one of $r$, $s$, $u$ and $v$ is the integer 2 and the others the integers 0 or 2 and Z and Z' are free or protected NH or OH respectively, or Z is N, or 3. condensing compounds of Formulae V and VI (V) $Ar_1—C_mH_{2m}—T$ + $U—C_pH_{2p}—CH-$ $(Ar_2Ar_3)$ (VI)

or reactive salts thereof, wherein one of T and U is the group $(O—Ph—CHZ'—CH(C_nH_{2n+1})Z'')H$ in which Z' and Z'' are free or protected OH or NH respectively, and the other of T and U is reactively esterified OH, or U is amino and T said moiety wherein Z' is free or protected OH and Z'' reactively esterified OH or 4. reacting compounds of Formulae VII and VIII (VII) 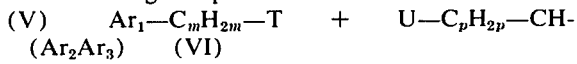 + H—W—H (VIII)

wherein one of V and W is oxygen and the other is $N—C_pH_{2p}—CH—(Ar_2Ar_3)$ and liberating in any resulting product any protected or metallized group to Z and Z'' being NH and Z' being OH and, if desired, converting any resulting compound into another compound of the invention.

Protected hydroxy or amino groups Z, Z' and Z'' are preferably such, that can easily be liberated, e.g. by hydrolysis or hydrogenolysis, for example, ester, amide or advantageously benzylic groupings, such as lower alkanoyloxy, aralkanoyloxy or α-aralkoxy or -amino groups, e.g. $R—COZ^0$, $Ar_1—C_nH_{2n}—COZ^0$ or $Ar_1—CHRZ^0$, wherein R is hydrogen or lower alkyl and $Z^0$ oxygen or nitrogen respectively. Z' and Z or Z'', when taken together, may also represent a cyclic esteramide grouping, such as that of the following partial formulae

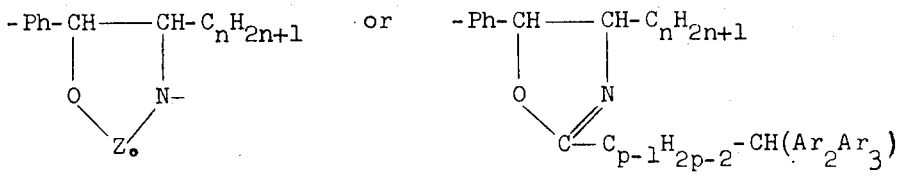

wherein $Z_0$ is the radical of an acid, preferably carbonyl or thiocarbonyl, and the oxazoline can be visualized as a tautomer of the Schiff's base IV, wherein Z and Z' together are linked with the bisarylalkyl moiety.

A reactively esterified hydroxy group T, U or Z'' is preferably such esterified with a strong inorganic or organic acid, preferably a hydrohalic, e.g. hydrochloric, -bromic or -iodic acid, or an alkane or benzene sulfonic acid, e.g. methane, p-toluene or m-bromobenzene sulfonic acid.

The reduction of the ketones and/or amides III is performed according to known methods, the former, for example, by hydrogenation with catalytically activated or nascent hydrogen, e.g. hydrogen in the presence of platinum or nickel catalysts, or generated by electrolysis or the action of alkali metals or lower alkanols, or according to Meerwein-Ponndorf-Verley, i.e. with the use of lower alkanols, e.g. i-propanol, and the corresponding aluminum alkanolate, e.g. aluminum isopropylate. Either ketones or amides are advantageously reduced with the use of reducing agents, such as simple or complex light metal hydrides, such as boranes or aluminum hydride, preferably alkali metal boron or aluminim hydrides, e.g. lithium aluminum hydride, sodium borohydride or lithium or sodium tri-lower alkoxy- or bis-alkoxyalkoxyaluminum hydrides, such as lithium tri-t.butoxy- or sodium bis-(2-methoxyethoxy)-aluminum hydride.

The reduction of compounds IV is similarly carried out, i.e. with the use of hydrogen in the presence of the above catalysts. Schiff's bases IV or oxazolines can also be reduced with nascent hydrogen or the reducing agents mentioned above, preferably simple light metal hydrides, e.g. boranes. Schiff's bases with $n = O$, $u = 2$ and $v = O$, can also be reduced with $C_nH_{2n+1}$—Grignard compounds, e.g. lower alkylmagnesium halides and the metal adducts hydrolysed with water or aqueous ammonium salts, in order to obtain compounds of Formula I with $n>0$.

The condensation of V and VI is preferably carried out with the use of reactive salts of the phenols or amines respectively, such as alkali metal, e.g. sodium or potassium salts, or in the presence of condensing agents, neutralizing the eliminated acids (TH, UH or Z''H) and/or attracting any water formed, such as inorganic or organic (nitrogen) bases, e.g. alkali or alkaline earth metal carbonates or hydrogen carbonates; tri-lower alkylamines or pyridines, or anhydrous forms of salt hydrates or azeotropic solvents respectively.

The reaction of VII with VIII is also carried out in the usual manner, for example, the epoxides are reacted with the amine $H_2N-C_pH_{2p}-CH(Ar_2Ar_3)$, or the aziridines with water, preferably in the presence of acids or acidic salts, e.g. ammonium halides in the first, and inorganic or organic acids, e.g. those mentioned above or below, in the second instance.

Either in the course of the reaction, or subsequently, any protected hydroxy and/or amino group Z, Z' and Z'' can be liberated in the usual manner, e.g. by hydrolysis of the ester or amide groupings, or by hydrogenolysis of the $\alpha$-aralkyl groups, e.g. either with the use of water alone or preferably aqueous acids or bases respectively, advantageously aqueous mineral acids or alkali metal hydroxides or catalytically activated hydrogen respectively.

The resulting compounds of the invention can be converted into each other according to known methods. Thus, for example, any resulting halogen compound can be dehalogenated either in the course of any of the above hydrogenations or subsequently under more drastic conditions, e.g. higher temperature and/or pressure, and the course of these reactions is easily observed and controlled by the amount of consumed hydrogen. Moreover, the compounds of the invention are obtained in the free form or in the form of their acid addition salts, depending on the conditions under which the process is carried out. Salts that are obtained can be converted into the free bases in known manner, for example, with ammonia, alkalies or ion exchangers. Free bases that are obtained can be converted into salts by neutralization with acids, especially those that are suitable for the formation of therapeutically useful acid addition salts. Such acids are inorganic or organic acids, for example, mineral acids, such as a hydrohalic, e.g. hydrochloric or hydrobromic acid; sulfuric, phosphoric, nitric or perchloric acid; aliphatic or aromatic carboxylic or sulfonic acids, such as formic, acetic, propionic, succinic, glycollic, lactic, malic, tartaric, citric, ascorbic, maleic, hydroxymaleic, pyroracemic, phenylacetic, benzoic, aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halobenzenesulfonic, toluenesulfonic, naphthalenensulfonic, sulfanilic or cyclohexylsulfamic acid; methionine, tryptophan, lysine or arginine. These or other salts, for example, the picrates, can also be used in the purification of the free compounds. In view of the close relationship between the salts and the free compounds, whenever such is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example, by separation of diastereomeric salts thereof, e.g. by the fractional crystallization of d- or l-tartrates- The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts or optically pure antipodes.

The starting material is known or, if new, can be prepared according to methods known per se, e.g. those illustrated by the examples herein.

Thus, for example, the products III and olefines IV are obtained from the corresponding phenolates by condensation with reactive esters of $Ar_1-C_mH_{2m(-q)}-OH$ according to (3), or reacting compounds V, wherein T is said moiety, with reactive, functional derivatives of $HOOC.C_{p-1}H_{2p-2}-CH(Ar_2Ar_3)$, e.g. halides or anhydrides thereof. The former phenols are either known or can be obtained by condensing compounds disclosed in Belgium Patent No. 660,217, i.e. those of the formula $HO-Ph-CO-CHNH_2-C_nH_{2n+1(-s)}$ with V and VI respectively, or corresponding olefines, wherein T and U is reactively esterified hydroxy, in subsequent steps and also according to the conditions mentioned for (3). The Schiff's bases are obtained from the corresponding free or protected aminoalcohols $HO-Ph-CHOH-CHNH_2-C_nH_{2n+1(-s)}$ by condensation with the aldehyde $OCH-[C_pH_{2p+1(-U)}](Ar_2Ar_3)$ followed by $Ar_1-C_mH_{2m-(q)}-T$, e.g. according to Example 4. The oxazolines are similarly obtained from said aminoalcohols, or the corresponding phenol ether V, by condensation with halides or the nitrile of the above bis-arylalkanoic acid. Compounds V and VI are similarly prepared from $HO-Ph-CHZ'-CHZ''-C_nH_{2n+1}$ by condensation with $Ar_1-C_mH_{2m}-T$ or $U-C_pH_{2p}-CH(Ar_2Ar_3)$, wherein T is reactively esterified OH and one of U and Z'' is T and the other $NH_2$. The protection of the hydroxy and amino groups can be carried out in the usual manner, e.g. similar to the procedures shown in French Patents Nos. 2,013,686 and 2,013,689. Finally, the compounds VII and VIII are prepared analogous to the procedures of French Patents Nos. 2,013,687 and 2,013,688, e.g. by reacting the olefine $Ar-C_mH_{2m}-O-Ph-CH=CH-C_nH_{2n+1}$ with either peracetic acid or iodoisocyanate, followed by condensing the resulting 1-unsubstituted aziridine with $U-C_pH_{2p}-CH(Ar_2Ar_3)$ according to (3). Mainly those starting materials should be used in the above reactions that lead to the formation of those compounds indicated above as being specially valuable, e.g. compounds of Formula II.

The pharmacologically active compounds of the invention are useful in the manufacture of pharmaceutical compositions comprising an effective amount thereof in conjuction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously prepared from fatty emulsions or suspensions. They may be sterilized and/or contain adjuvants, such as preserving, stabilizing, wetting or emulsifying agents, solution promoters, salts for regulating the osmtic pressure and/or buffers. Said pharmaceutical compositions may also contain other therapeutically valuable substances, e.g. diuretics and/or psychotherapeutics as disclosed in U.S. Pat. Nos. 3,081,230 or 3,499,082. Said compositions are prepared according to conventional mixing, granulating or coating methods respectively and contain about 0.1 to 75%, preferably about 1 to 50%, of the active ingredient.

EXAMPLE 1

The mixture of α-(3,3-diphenylpropylamino)-p-benzyloxypropiophenone hydrochloride, 400 ml of ethanol and 4 ml of 10% aqueous sodium hydroxide is stirred several minutes, whereupon 16 g of sodium borohydride are added. The whole is stirred at 70°C for 18 hours, cooled and acidified with hydrochloric acid. The resulting solution is made basic with sodium carbonate, extracted with diethyl ether, the extract dried and saturated with hydrogen chloride. The mixture is concentrated to about 1/10 its volume, the precipitate collected and recrystallized from ethanol-diethyl ether, to yield the d,1-erythro-α-[1-(3,3-diphenylpropylamino)-ethyl]-p-benzyloxybenzyl alcohol hydrochloride of the formula

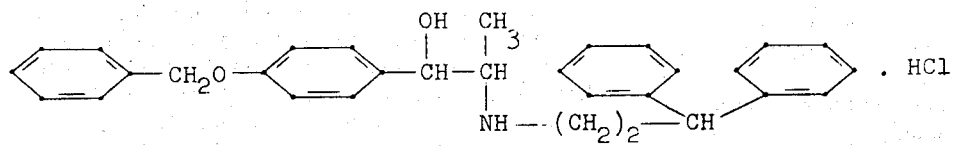

melting at 219°–221°.

The same product is obtained when the solution of 97.2 g of α-(3,3-diphenylpropylamino)-p-benzyloxypropiophenone in 1 lt of dry diethyl ether is treated with 60 ml of a 70% solution of sodium bis-(2-methoxyethoxy)-aluminum hydride in benzene over a 3 hour period at room temperature. The mixture is quenched with aqueous sodium hydroxide, extracted with diethyl ether, the extract dried, gassed with excess hydrogen chloride and concentrated to a smaller volume; m.p. of the precipitate 220°–221°.

The starting material is obtained as follows: The mixture of 10.55 g of 3,3-diphenylpropylamine, 15.95 g of α-bromo-p-benzyloxypropiophenone and 250 ml of triethylamine is stirred at reflux for 3 hours and at room temperature for 16 hours. It is filtered, the filtrate evaporated under reduced pressure and the residue taken up in acetone. The solution is gassed with hydrogen chloride, the precipitate formed filtered off and recrystallized from methanol-diethyl ether, to yield the α-(3,-3-diphenylpropylamino)-p-benzyloxypropiophenone hydrochloride melting at 227°–231°.

EXAMPLE 2

To the solution of 140 g of α-(3,3-diphenylpropylamino)-p-(m-chlorobenzyloxy)-propiophenone in 800 ml of dry benzene, 100 ml of a 70% solution of sodium bis-(2-methoxyethoxy)-aluminum hydride is added dropwise during 45 minutes while stirring under nitrogen. The mixture is refluxed for 90 minutes, allowed to stand overnight at room temperature and combined with 100 ml of 0.1 N aqueous sodium hydroxide, followed by 100 ml of water.

The mixture is extracted with 1.2 lt of chloroform, the extract dried and evaporated under reduced pressure. The residue is taken up in 700 ml of acetone, the solution combined with 21 ml of concentrated hydrochloric acid, the solution refrigerated, the precipitate formed filtered off and twice recrystallized from ethanol-diethyl ether, to yield the d,1-erythro-α-[1-(3,3-diphenylpropylamino)-ethyl]-p-(m-chlorobenzyloxy)-benzyl alcohol hydrochloride melting at 197°–199°.

Similarly, the hydrochlorides of the d,1-erythro-α-[1-(3,3-diphenylpropylamino)-ethyl]-p-(p-methyl or o-methoxybenzyloxy)-benzyl alcohols are prepared, melting at 223.5°–224.5° and 217°–219° respectively. The d,1-erythro-α-[1-(3,3-diphenylpropylamino)-ethyl]-p-(β-phenethoxy)-benzyl alcohol is obtained as a crystalline free base melting after recrystallization from isopropanol and purification with charcoal at 99°–101°.

The starting material is prepared as follows: The mixture of 75 g of p-hydroxypropiophenone, 88.5 g of m-chlorobenzylchloride, 90 g of potassium carbonate, 8 g of potassium iodide, 300 ml of ethanol and 40 ml of water is refluxed for 4 hours while stirring. It is combined with 500 ml of hot water, cooled and the precipitate formed filtered off. It is washed with water and recrystallized from 2 lt of ethanol, to yield the p-(m-chlorobenzyloxy)-propiophenone, melting at 75°–76°.

Analogously, the p-(p-methyl or o-methoxybenzyloxy and the β-phenethoxy)-propiophenones are prepared, melting at 94°–96.5°, 79°–82° and 66°–68° respectively.

The mixture of 128 g of p-(m-chlorobenzyloxy)-propiophenone, 233 g of pyrrolidone hydrotribromide and 1.75 lt of tetrahydrofuran is stirred at room temperature for 18 hours and warmed gently on the steam bath for one hour. It is cooled, filtered, the filtrate evaporated under reduced pressure and the residue recrystallized from 800 ml of ethanol, to yield the α-bromo-p-(m-chlorobenzyloxy)-propiophenone, melting at 88°–89°.

Analogously, the α-bromo-p-[(p-methyl or o-methoxy)-benzyloxy and the β-phenethoxy]-propiophenones are prepared, the latter two of which melt at 72°–74° and 76°–80° respectively.

The mixture of 88 g of α-bromo-p-(m-chlorobenzyloxy)-propiophenone, 52.8 g of 3,3-diphenylpropylamine and 500 ml of triethylamine is refluxed for 18 hours while stirring. It is cooled, filtered and the filtrate evaporated under reduced pressure, to yield the α-(3,3-diphenylpropylamino)-p-(m-chlorobenzyloxy)-propiophenone.

In the similar way the α-(3,3-diphenylpropylamino)-p-[(p-methyl- or o-methoxy)-benzyloxy or the β-phenethoxy]-propiophenones are prepared.

EXAMPLE 3

To the solution of 15 g of d,1-erythro-α-[1-(3,3-diphenylpropylamino)-ethyl]-p-hydroxybenzyl alcohol hydrochloride in 150 ml of dimethylsulfoxide, 4 ml of 10 N aqueous sodium hydroxide are added and the mixture stirred for 15 minutes at room temperature.

Thereupon 8.2 g of m-chlorobenzyl bromide are added and the mixture stirred for 18 hours at room temperature. It is poured into 800 ml of saturated aqueous sodium chloride, the mixture extracted three times with 200 ml of ethyl acetate, the extract dried and evaporated under reduced pressure. The residue is taken up in 100 ml of acetone, 4 ml of concentrated hydrochloric acid are added, the solution decolorized with carbon, diluted with 150 ml of water, refrigerated and the precipitate formed filtered off, to yield the d,l-erythro-α-[1-(3,3-diphenylpropylamino)-ethyl]-p-(m-chlorobenzyloxy)-benzyl alcohol hydrochloride, melting at 197°–199°.

In the analogous manner the d,l-erythro-α-[1-(3,3-diphenylpropylamino)-ethyl]-p-(o- and p-chlorobenzyloxy)-benzyl alcohol hydrochlorides are obtained, melting at 206°–209° and 198°–201° respectively. Also the d- and l-erythro-antipodes of said three chloro isomers are similarly obtained.

The starting material is prepared as follows: The mixture of 6.68 g of d,l-erythro-p-hydroxynorephedrine, 8.32 g of 3,3-diphenylacrolein and 400 ml of 2-methoxyethanol is hydrogenated over 4 g of 5% platinum on charcoal at room temperature and atmospheric pressure until the uptake of hydrogen ceases. The mixture is filtered and the filtrate evaporated under reduced pressure, to yield the d,l-erythro-α-[1-(3,3-diphenylpropylamino)-ethyl]-p-hydroxybenzyl alcohol; the acetate thereof melts at 205°–209°.

The mixture of 2 g of d-erythro-p-hydroxynorephedrine, 2.1 g of 3,3-diphenylacrolein and 100 ml of 2-methoxyethanol is hydrogenated over 1 g of 10% platinum on charcoal at room temperature and atmospheric pressure until the uptake is complete. It is filtered, the filtrate evaporated under reduced pressure and the residue taken up in diethyl ether. The solution is treated with charcoal, filtered and the filtrate gassed with hydrogen chloride. The precipitate formed is filtered off and recyrstallized from isopropanol-diethyl ether, to yield the d-erythro-α-[1-(3,3-diphenylpropylamino)-ethyl]-p-hydroxybenzyl alcohol hydrochloride, melting at 188°–189°. Analogously, the levorotatory compound is prepared.

EXAMPLE 4

5 g of d,l-erythro-α-[1-(3,3-diphenylallylamino)-ethyl]-p-(m-chlorobenzyloxy)-benzyl alcohol in 50 ml of 2-methoxyethanol are hydrogenated over 1 g of 10% platinum on charcoal at room temperature and atmospheric pressure, until the hydrogen absorption ceases. The mixture is filtered, the filtrate evaporated under reduced pressure, the residue taken up in acetone, the solution acidified with concentrated hydrochloric acid, the precipitate formed filtered off and recrystallized from ethanol-diethyl ether, to yield the d,l-erythro-α-[1-(3,3-diphenylpropylamino)-ethyl]-p-(m-chlorobenzyloxy)-benzyl alcohol hydrochloride, melting at 197°–199°.

The starting material is prepared as follows: The mixture of 33.4 g of d,l-erythro-p-hydroxynorphedrine, 41.6 g of 3,3-diphenylacrolein and 500 ml of dry benzene is stirred and refluxed on a water trap until 3.6 ml of water are collected. It is evaporated under reduced pressure and the residue recrystallized from benzene, to yield the d,l-erythro-α-[1-(3,3-diphenylallylideneimino)-ethyl]-p-hydroxybenzyl alcohol, melting at 110°–114°.

17.85 g thereof are hydrogenated in 150 ml of 2-methoxyethanol over 5 g of 10% platinum on charcoal at room temperature and atmospheric pressure until 1.52 lt of hydrogen have been absorbed. The mixture is filtered, the filtrate evaporated under reduced pressure, the residue taken up in acetone, the solution treated with charcoal, filtered, evaporated and the residue triturated with diethyl ether, to yield the d,l-erythro-α-[1-(3,3-diphenylallylamino)-ethyl]-p-hydroxybenzyl alcohol, melting at 138°–141°.

To the mixture of 7.35 g thereof, 70 ml of dimethylsulfoxide and 2.05 ml of 10N aqueous sodium hydroxide, 3,3 g of m-chlorobenzyl chloride are added while stirring at room temperature. After 18 hours 1 lt of ethyl acetate is added, the mixture washed three times with 100 ml of water, the organic layer dried and evaporated under reduced pressure. The residue is triturated with diethyl ether and recrystallized from isopropanol, to afford the d,l-erythro-α-[1-(3,3-diphenylallylamino)-ethyl]-p-(m-chlorobenzyloxy)-benzyl alcohol, melting at 140°–142°.

EXAMPLE 5

To the solution of 3.85 g of d-erythro-α-[1-(3,3-diphenylpropylamino)-ethyl]-p-hydroxybenzyl alcohol (obtained by evaporation of the charcoal filtrate according to Example 3), in 25 ml of dimethylsulfoxide, 1.94 ml of 10N aqueous sodium hydroxide are added and the mixture stirred at room temperature for one hour. Thereupon 1.56 g of m-chlorobenzyl chloride are added and the mixture stirred at room temperature for 16 hours. It is diluted with 100 ml of ethyl acetate and 200 ml of water, the organic layer separated and the aqueous solution extracted with ethyl acetate. The combined organic solutions are dried, evaporated under reduced pressure and the residue taken up in the minimum amount of diethyl ether. The solution is acidified with ethereal hydrogen chloride, the mixture refrigerated for 18 hours and the precipitate formed collected. It is washed with water, dried and recrystallized from isopropanol, to yield the d-erythro-α-[1-(3,3-diphenylpropylamino)-ethyl]-p-(m-chlorobenzyloxy)-benzyl alcohol hydrochloride, melting at 217°–219°; $[\alpha]_{589} = +48°$ ($c = 5\%$ in methanol).

Similarly, the levorotatory antipode thereof is prepared, m.p. 219°–221°, $[\alpha]_{589} = -50°$ ($c = 5\%$ in methanol).

EXAMPLE 6

To the solution of 5.82 g of l-erythro-p-(m-chlorobenzyloxy)-norephedrine in 120 ml of toluene, 5.5 g of 3,3-diphenylpropyl bromide and 2.8 g of potassium carbonate are added while stirring and the mixture refluxed for 18 hours. It is filtered, the filtrate evaporated under reduced pressure, the residue triturated with hexane-ethyl acetate (15:1), dissolved in the minimum amount of methanol, the solution acidified with ethereal hydrogen chloride and the precipitate formed collected, to yield the l-erythro-α-[1-(3,3-diphenylpropylamino)-ethyl]-p-(m-chlorobenzyloxy)-benzyl alcohol hydrochloride, melting at 219°–221°; it is identical with that obtained according to Example 5.

The starting material is prepared as follows: To the solution of 16.7 g of l-erythro-p-hydroxynorephedrine [Rec. Trav. Chim. 80, 573(1961)] in 100 ml of dimethylsulfoxide, 10 ml of 10N aqueous sodium hydroxide are added while stirring and 15 minutes later followed by 16.1 g of m-chlorobenzyl chloride. The mixture is stirred at room temperature for 30 hours, poured into 200 ml of ice water, the aqueous solution decanted off and the residue taken up in p200 ml ethyl acetate. The solution is washed with water, dried, concentrated under reduced pressure to 50 ml, the concentrate diluted with petroleum ether and the precipitate formed collected, to yield the 1-erythro-p-(m-chlorobenzyloxy)-norephedrine melting at 91°–93°.

Similarly, the d,1-erythro-p-hydroxynorephedrine is converted into its benzyl ether hydrochloride, m.p. 211°–214°; its o-chlorobenzyl ether hydrochloride, m.p. 192°–195°; its m-chlorobenzyl ether acetate, m.p. 155°–157°; and its p-chlorobenzyl ether acetate, m.p. 184.5°–185.5°, the bases of which are analogously reacted with 3,3-diphenylpropyl bromide, to yield the corresponding, previously described compounds of the invention.

EXAMPLE 7

To the solution of 500 mg of d,1-erythro-α-[1-(2,2-diphenylpropionamide)-ethyl]-p-(m-chlorobenzyloxy)-benzyl alcohol in 10 ml of tetrahydrofuran, 50 mg of lithium aluminum hydride are added and the mixture refluxed overnight under moisture exclusion. It is cooled, 50 mg of ice are added, followed by 0.1 ml of 15% aqueous sodium hydroxide while stirring. The mixture is extracted with chloroform, the extract washed with water, dried and evaporated under reduced pressure. The residue is taken up in the minimum amount of acetone and the solution slightly acidified with concentrated hydrochloric acid. The precipitate formed after cooling is collected, to yield the d,1-erythro-α-[1-(3,3-diphenylpropylamino)-ethyl]-p-(m-chlorobenzyloxy)-benzyl alcohol hydrochloride melting at 197°–199°; it is identical with that obtained according to Example 2.

The starting material is prepared as follows: To the solution of 2.9 g of d,1-erythro-p-(m-chlorobenzyloxy)-norephedrine in 150 ml of chloroform, 5.0 g of 3,3-diphenylpropionic anhydride and 0.84 g of sodium bicarbonate are added while stirring and the mixture refluxed for 14 hours. After cooling it is washed with saturated aqueous sodium carbonate, dried and evaporated under reduced pressure. The residue is recrystallized from benzene, to yield the d,1-erythro-α-[1-(2,2-diphenylpropionamido)-ethyl]-p-(m-chlorobenzyloxy)-benzyl alcohol, melting at 163°–165°.

EXAMPLE 8

Preparation of 1,000 tablets, each containing 10 mg of the active ingredient:

10 g of d,1-erythro-α-[1-(3,3-diphenylpropylamino)-ethyl]-p-(m-chlorobenzyloxy)-benzyl alcohol hydrochloride, 5.0 g of highly dispersed silicic acid and 89.1 g of corn starch are well mixed and the mixture is uniformly moistened with a solution of 5.0 g of gelatin, 2.0 g of glycerin and 0.9 g of sodium metabisulfite in 100 ml of demineralized water. The resulting mass is granulated through a sieve and dried to a water content of 1.0 to 2.1% (absolute). The dry granulate is mixed with 8.0 g of potato starch, 1.0 g of highly dispersed silicic acid, 8.0 g of talcum and 1.0 g of magnesium stearate and the mixture is pressed into 1,000 tablets.

EXAMPLE 9

Preparation of 1,000 capsules, each containing 25 mg of the active ingredient:

Example 9

Preparation of 1,000 capsules, each containing 25 mg of the active ingredient:

Formula:
| | |
|---|---|
| d-erythro-α-[1-(3,3-diphenylpropyl-amino)-ethyl]-p-(m-chlorobenzyloxy)-benzyl alcohol hydrochloride | 25 g |
| Corn starch | 272 g |
| Magnesium stearate | 3 g |

PROCEDURE

The ingredients are mixed, passed through a screen with openings of 0.6 mm and introduced into 1,000 two-piece hard gelatin No. 1 capsules.

I claim:

1. An antihypertensive composition, comprising an antihypertensively effective amount of a compound corresponding to the formula

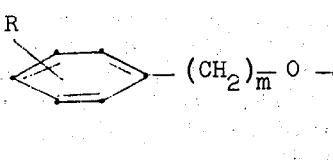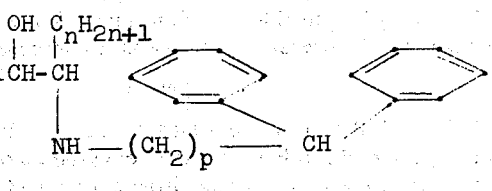

wherein R is hydrogen, lower alkyl, lower alkoxy, halogeno or trifluoromethyl and each of $m$, $n$ and $p$ is the integer 1 or 2, or a therapeutically useful acid addition salt thereof, together with a pharmaceutical excipient suitable for oral application.

2. A composition as claimed in claim 1, wherein the compound is the dextrorotatory erythro-antipode of α-[1-(3,3-diphenylpropylamino)-ethyl]-p-(m-chlorobenzyloxy)-benzyl alcohol, or a therapeutically useful acid addition salt thereof.

* * * * *